United States Patent [19]

Brandenstein et al.

[11] 4,219,240
[45] Aug. 26, 1980

[54] WHEEL FOR ROLLER SKATES OR THE LIKE

[75] Inventors: Manfred Brandenstein, Aschfeld; Armin Olschewski, Schweinfurt; Sigismund Finzel, Dittelbrunn; Willi Gössmann, Niederwerrn; Josef Stark, Hambach, all of Fed. Rep. of Germany

[73] Assignee: SKF Kugellagerfabriken GmbH, Schweinfurt, Fed. Rep. of Germany

[21] Appl. No.: 900,258

[22] Filed: Apr. 26, 1978

[30] Foreign Application Priority Data

May 28, 1977 [DE] Fed. Rep. of Germany ... 7717024[U]

[51] Int. Cl.³ .............................................. A63C 17/22
[52] U.S. Cl. ................................ 301/5.7; 301/63 PW; 152/323
[58] Field of Search .................. 301/5.3, 5.7, 63 PW; 152/7, 48, 323–324, 326, 310–311, 318–319; 16/45–47, 98, 107; 280/87.04 A

[56] References Cited

U.S. PATENT DOCUMENTS

| 3,895,844 | 7/1975 | Merbler | 301/5.7 |
| 4,040,570 | 8/1977 | Williams | 301/5.3 |
| 4,054,335 | 10/1977 | Timmer | 310/5.3 X |
| 4,135,763 | 1/1979 | Kosono et al. | 301/5.7 |

Primary Examiner—Charles A. Marmor
Attorney, Agent, or Firm—Eugene E. Renz, Jr.

[57] ABSTRACT

A wheel construction comprising a bearing and a mantle circumscribing the bearing made of a given material, and a reinforcing ring of a material harder than the mantle which is embedded therein, the reinforcing ring having a circumferentially extending flexible protrusion extending beyond at least one axial end face of the bearing at one side of the wheel.

6 Claims, 1 Drawing Figure

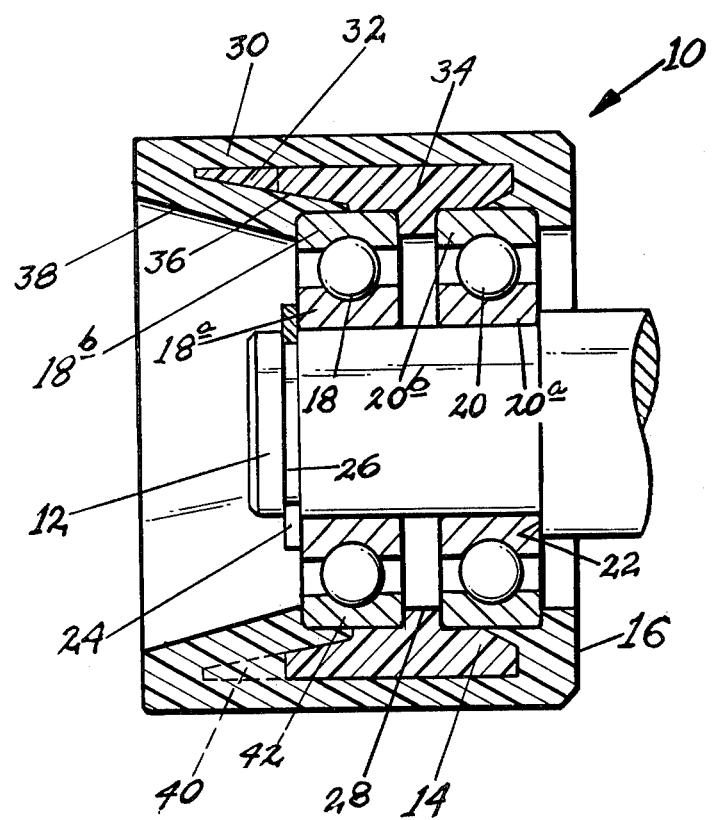

WHEEL FOR ROLLER SKATES OR THE LIKE

BACKGROUND OF THE INVENTION

The present invention relates to a wheel construction and more specifically the invention relates to wheels for use on roller skates or the like.

These wheels generally consist of a bearing journaling the wheel to an axle and a wheel cover or mantel surrounding a reinforcing ring of a harder material. Typically in these known wheel assemblies, the mantle is of a uniform cross section through substantially its entire width so that it has the same radial spring action or resilience over this width. By reason of this construction, it has been found that the wheel has limited maneuverability. More specifically, in application such as in roller skates, skateboards or the like, a certain differential action is needed between the wheel mantle and the track or roadway to effect cornering. This limitation is due directly to the even radial spring action of the wheel mantle.

Better turning, cornering and braking characteristics are produced when the resilient mantle or cover of the wheel has a greater elastic resilience at one or both axial ends than at its central portion. In order to attain this desired uneven spring action of the resilient mantle or cover, the mantle can be mounted so that it protrudes axially at one or both sides past the more rigid supporting ring of the bearing. This spring action can also be achieved by forming the mantle with conical chambers or circular indentations in end faces. In order to achieve this flexibility, a relatively stiff and hard material must be provided for the wheel mantle which is able to withstand the high bending strain but which no longer has the required shock absorbing and traction capacities on the track or roadway. Thus with the unavoidable wear of the wheel mantle during the operation, the mantle is weakened on its flexible sides so that the spring action characteristics of the wheel mantle continuously change whereby the wheel lacks the required constant uniform riding characteristics.

It is also known to provide a wheel for skateboards wherein the mantle is molded on one side with a plastic of a lesser hardness than in its middle and on its opposite axial end. Two different molding materials must thus be used to manufacture this type of wheel mantle. This technique requires relatively complicated casting tools with many parts. Consequently it has been found that this type of wheel is relatively uneconomical to produce.

With the above in mind, an object of the present invention is to provide an improved wheel for roller skates, skateboards and similar equipment which is characterized by novel features of construction and arrangement including a wheel mantle with increased resilience on both axial ends, which resilience does not materially or significantly change with wear during operation. The wheel construction, therefore, is characterized by good shock absorbing capacity and is relatively economical to manufacture.

SUMMARY OF THE INVENTION

In accordance with the present invention, there is provided a wheel construction including a reinforcing ring having a flexible protrusion extending far beyond the end face of the bearing on at least one axial end of the wheel. The radial resiliency of the wheel mantle on the corresponding side is thus increased because the latter is not resting or supported in a radial direction by the outer ring of the anti-friction bearing located at that end. Further the magnitude of the elastic resilience is determined in this annular area essentially by the stiffening effect of the reinforcing ring and this magnitude is independent of wear of the wheel mantle which is made of a relatively soft and resilient material.

In accordance with another feature of the invention, the axial protrusion of the reinforcing ring is of a varying thickness and in the specific embodiment illustrated tapers off toward the outer axial end of the wheel. Additionally, the protrusion of the reinforcing ring in the area where it extends axially beyond the outer ring of the bearing may be provided with a plurality of circumferentially spaced, axially directed radial slits. By this construction the mantle is characterized by a radial resiliency which gradually increases toward the outer axial end of the wheel by reason of the flexing spring action of the protrusion.

In accordance with another feature of the invention, the axial projection of the reinforcing ring is less than the axial projection of the mantle so that the wheel mantle is relatively soft at its axial end face and can thus properly sustain and damp lateral initial shocks of the wheel.

In the specific embodiment illustrated, the wheel construction includes one or more anti-friction bearings which have at least two outer race rings arranged side by side which are supported and centered with respect to each other by a retaining ring so that the retaining ring functions as a reinforcing ring as well as providing the resilient damping action set forth above.

The wheel assembly is comparatively easy and economical to manufacture and in this regard the reinforcing ring can be made of a plastic by a conventional pour molding or press molding process which is especially adapted for low cost, economical manufacture of the wheel in mass produced quantities.

DESCRIPTION OF THE DRAWING

These and other objects of the present invention and various features and details of the operation and construction thereof are hereinafter more fully set forth with reference to the accompanying drawing, wherein:

FIG. 1 is a transverse sectional view showing a wheel construction in accordance with the present invention.

DESCRIPTION OF A PREFERRED EMBODIMENT

Referring now to the drawing, there is illustrated a wheel constructed in accordance with the present invention generally designated by the numeral 10. The wheel is especially adapted for use in roller skates or skateboards wherein they are mounted in pairs at opposite axial ends of an axle shaft 12. In the present instance, the wheel assembly comprises a reinforcing ring 14 and a mantle 16 rotatably journaled on the axle shaft by, in the present instance, two grooved ball bearings 18 and 20. The support of the bearings on the shaft is conventional and as illustrated, the inner race ring 20a of ball bearing 20 abuts a shoulder 22 on the shaft 12 and the inner race ring 18a of bearing 18 is laterally held in place by a snap ring 24 engaging in a groove 26 adjacent the outer axial end of the shaft in the manner illustrated. The bearings are maintained in predetermined axial spaced-apart relation by the reinforcing ring which circumscribes and overlies the outer ring 18b and 20b of the bearing assemblies and has a circumferentially extending radially inwardly directed rim or projection 28 maintaining the bearings in spaced relation. The reinforcing ring thus serves as a retaining ring for the two outer race rings which are arranged in side by side spaced relation and which are built into the reinforcing ring so as to be centered with respect to each other.

In the present instance, the wheel mantle 16 circumscribes the reinforcing ring 14 and essentially encapsulates the same and has an axially extending projection 30 extending axially beyond the end face of the outer bearing 18. This projection portion of the mantle houses a flexible protrusion 32 of the reinforcing ring 14 which likewise projects beyond the outer bearing 18. The reinforcing ring is preferably made of a relatively hard flexible material, e.g. fiber reinforced plastic and can be produced by a conventional pour molding or press molding process.

As illustrated the reinforcing ring 14 has a body portion 34 of generally uniform cross section and the protrusion 32 extends axially from the body portion and diverges outwardly toward its axial terminal end thereby defining a frusto-conical inner face or bore 36. By this arrangement, the thickness of the protrusion gradually diminishes from the body portion toward the axial end thereof. The mantle 16 likewise has a tapered bore 38 which gradually diminishes in cross section from the outer bearing to its outer axial end face. In order to increase the elastic resilience of the wheel mantle toward its extreme outer axial end, the protruding portion 32 of the reinforcing ring may be provided with a series of circumferentially spaced, axially extending radial through slits 40.

Considering now briefly the manufacture of a wheel in accordance with the present invention, the ball bearings 18 and 20 are assembled into the bore of the body portion of the reinforcing ring from opposite axial ends so that the confronting axial end faces of the outer rings 18b and 20b abut the divider rim 28 of the reinforcing member. The mantle 16 which is made of a wear resistant, relatively soft and shock absorbing polyurethane is then formed in an injection molding process so that it encapsulates the reinforcing member 14 and defines an annular pocket 42 within which the outer race rings of the bearings seat. As is clear, this is a very simple and economical means of mass producing wheels in accordance with the present invention. Thereafter the complete assembly is relatively easy to install on an axle shaft simply by engaging it over the reduced end of the axle and applying the snap ring 24.

A wheel constructed in accordance with the present invention has the advantage that even upon wear of the wheel mantle during operation, a substantially uniform radial resilience of the wheel's side remains intact. In other words the wheel always retains its structurally set operating characteristics. In skates or skateboards, this means that the wheel exhibits better cornering and braking characteristics one which the rider adjusts to initially and does not have to change upon wear of the wheel assembly.

Even though a specific embodiment of the invention has been illustrated and described herein, it is not intended to limit the invention and changes and modifications may be made therein without departing from the spirit of the invention. For example, instead of two grooved ball bearings, a single grooved ball bearing or a journal bearing can be built into the bore of the reinforcing ring in essentially the same manner as that described. Furthermore the wheel mantle may have an axially extending protrusion at both axial ends similar to the one illustrated. In this case, the reinforcing ring is likewise provided with axial extensions from either side of the body portion. In this manner the elastic resilience on both sides of the wheel mantle is greater than at its center or hub portion.

We claim:

1. A wheel construction comprising a bearing and a mantle circumscribing the bearing made of a given material, and a reinforcing ring of a material harder than the mantle which is embedded therein, said ring having a circumferentially extending flexible protruding section extending beyond at least one axial end face of the bearing at one side of the wheel, said protruding section of said reinforcing ring being provided with a plurality of circumferentially spaced radial through slits.

2. A wheel construction according to claim 1 wherein the through slits extend in an axial direction.

3. A wheel construction comprising a bearing and a mantle circumscribing the bearing made of a given material, and a reinforcing ring of a material harder than the mantle which is embedded therein, said mantle contacting an outer axial end face of the bearing and substantially encompassing said reinforcing ring, said ring having a circumferentially extending flexible protrusion in a protruding section of the mantle extending beyond at least the outer axial end face of the bearing at one side of the wheel and wherein the thickness thereof tapers off and gradually diminishes toward the axial end face of the wheel.

4. A wheel construction according to claim 3 wherein the protruding section of the reinforcing ring extends axially beyond the bearing a shorter distance than the protruding section of the mantle.

5. A wheel construction according to claim 3 wherein the protruding section now has a frusto-conical inner bore and gradually diminishes in thickness from a point adjacent the one axial end face of the bearing and the outer axial end face of the protrusion.

6. A wheel construction as claimed in claim 3 wherein the bearing comprises a pair of bearings each having an outer race ring, the bearings being arranged in space side-by-side relation and where said reinforcing ring includes a centering rib engaging between the outer race rings so that it serves as a retaining and reinforcing ring.

* * * * *